United States Patent

Oxaal et al.

[11] Patent Number: 6,126,600
[45] Date of Patent: Oct. 3, 2000

[54] ULTRASOUND IMAGE ASSISTED ADMINISTERING OF MEDICATION

[76] Inventors: John T Oxaal, 2022 Becky Dr., Bahama, N.C. 27503; Robert Samuel Smith, 1263 Emory St., San Jose, Calif. 95126; Olaf T Von Ramm, 4718 Harmony Church Rd., Efland, N.C. 27243

[21] Appl. No.: 09/072,732

[22] Filed: May 4, 1998

Related U.S. Application Data

[63] Continuation-in-part of application No. 08/697,075, Aug. 19, 1996, abandoned, which is a continuation of application No. 08/306,716, Dec. 2, 1994, Pat. No. 5,546,807.

[51] Int. Cl.$^7$ ........................................................ A61B 8/00
[52] U.S. Cl. ............................................. 600/439; 600/443
[58] Field of Search ................................... 600/437, 447, 600/439, 443; 604/19, 22, 20

[56] References Cited

U.S. PATENT DOCUMENTS

| | | | |
|---|---|---|---|
| 5,740,128 | 4/1998 | Hossack et al. | 600/443 |
| 5,879,303 | 3/1999 | Averkiou et al. | 600/447 |

*Primary Examiner*—William E. Kamm
*Assistant Examiner*—Maulin Patel
*Attorney, Agent, or Firm*—Robert Samuel Smith

[57] ABSTRACT

An apparatus and method for injecting a drug into a precisely selected location in a patient's body which is a combination scanner and drug injector. The scanner is a planar array of ultrasonic transducers which transmits a focused ultrasonic beam over the entire region of interest. The injector is preferably a hypodermic syringe mounted with the array on a base. The syringe is mounted to slide between one position where the injector conduit is retracted from the patient and another position where the adjustably positioned exit end of the conduit is in the desired location for injection of the drug. As the operator holds the scanner-injector against the patient's body with injector conduit retracted, he views on a monitor screen a virtual image of the conduit which is the image of the conduit after the conduit is injected into the body. The operator electronically adjusts the length of the virtual image and adjusts the position of the scanner-injector so that the exit tip of the virtual image is located at the desired location of the image of the region on the screen. Then the conduit is inserted into the body up to a length where the exit tip of the injector is at the desired location. Then the drug is injected into the patient. In another application of the apparatus and methods of the invention, a vacuum source is attached to the injector conduit and the device is used to aspirate fluids. instead of a drug In another embodiment, a portion of the ukltrasonic beam is focused on the region of interest before and during insertion of the conduit and drug to facilitate entry of the drug into the region of interest.

15 Claims, 13 Drawing Sheets

ULTRASOUND IMAGE ASSISTED ADMINISTERING OF MEDICATION

REFERENCE TO EARLIER APPLICATION

This application is a continuation-in-part of application Ser. No. 08/697,075 filed Aug. 19, 1996 now abandoned which was a continuation of Ser. No. 08/306,716 filed Dec. 2, 1994 now U.S. Pat. No. 5,546,807 for which priority is claimed.

FIELD OF THE INVENTION

This invention relates to methods of injecting medicine and aspirating regions of the body and particularly to a method and apparatus using ultrasound imagery.

BACKGROUND AND INFORMATION DISCLOSURE

The delivery of a drug to a desired location in the body has always posed a number of problems. The objective is normally to deposit the drug in a region, such as a specific organ, where the drug can benefit the intended organ and limit the delivery of the drug to other areas where the drug does no good or may actually produce undesired side effects.

This situation prevails particularly when administering medicine orally wherein the medicine must first pass through the alimentary tract before reaching the intended target. The result is that medicine is thereby deposited throughout the entire body which may result in side effects and may result in having to administer a much larger dose than would otherwise be required if the drug were delivered to a localized region.

One method for delivering the drug is by directing a spray to the underside of the tongue which is a particularly appropriate area for absorbing the medication directly into the bloodstream thereby avoiding the necessity to pass through the alimentary canal.

Another method of administering medication is through a tube (hypodermic needle) where the point of the needle is inserted under the skin. This method is used in a wide variety of situations such as for administering nutrients (intravenous feeding) and vaccines. The use of the hypodermic needle is very effective for placing the drug in a location which is close to the skin (e.g., intravenous feeding) but when used for depositing in deep lying organs, the positioning of the tip of needle is hit or miss and cannot be counted on to place the medication at an exact location unless the location is first exposed by a surgical procedure. Of course, any surgical procedure is accompanied by a degree of trauma.

Recently, a new electrochemotherpay (ECT) anti tumor treatment has been developed, which treatment consists of locally delivering shocks of high intensity electric pulses to tumor sites a short time after the systemic administration of chemotherapy. The DC electrical pulses open large transient pores in the plasma membranes of the exposed cells.

The electrochemotherapeutic agents can enter the cells through the pores resulting in locally enhanced cytotoxicity.

U.S. Pat. No. 5,386,837 to Sterzer discloses the use of force fields for enhancing delivery of chemotherapy. The general approach is to apply the medicine in an area adjacent the intended area (e.g., a tumor) and then to apply a "force" field which opens up transient pores in the plasma membranes of the targeted cells. The Sterzer patent discloses the use of any one of electromagnetic, laser or ultrasound waves to practice the invention.

The use of ultrasound imaging has become an important technology for examining soft tissue of the body and has become particularly widely used to provide direct real time examination of the cardiovascular system. The technology includes methods for presenting on a video monitor views of cross sections ("slices") showing movements that occur in these slices. Ultrasound imaging technology involves the use of a planar array of piezoelectric transducers wherein each transducer emits an ultrasonic wave having a phase relative to other members of the array such that a directed beam is radiated from the array and is programmed to "scan" an entire region of interest. The scanning beam is reflected by the target region and the intensity of the reflected beam which varies as the beam scans the entire region is stored in memory and used to create a visual image of the scanned area on a monitor screen.

U.S. Pat. No. 4,581,636 to Blaker discloses "B slice" scanners which includes a digital scan converter to change echo data stored in digital memory into television format. (A "B-slice" is a planar section of an organ of the body wherein the plane of the slice intersects the source of the ultrasonic beam.) The scan converter includes a frame buffer memory wherein each address is identified by variables u, v, the coordinates of the corresponding location on the display screen. When memory location u,v is addressed, the coordinate values u, v are transformed to a pointer vector in object space which is used to address a location in memory where ultrasonic intensity data corresponding to the location in object space has been stored and this intensity data is then presented as visual intensity at location u,v on the monitor screen. The image on the display screen is refreshed typically every 1/30 sec.

SUMMARY

It is an object of this invention to provide a method and device for injecting a selected drug into a preselected location in the body with greater accuracy than is accomplished with present techniques.

It is another object to be able to inject a drug into a location lying deep in the body without being required first to expose the location by a surgical procedure.

It is a further object to substantially reduce the amount of damage that otherwise occurs with present day procedures for injecting a conduit such as a hypodermic needle deep into the human body.

It is also an object to visually preselect the location for administering the drug before any injection device is actually inserted into the body.

This invention is directed toward a device that may be hand held which is a combination ultrasonic scanner and drug injector. The scanner is a two dimensional phased array of ultrasound transducers preferably mounted on an area of a hand held base and an injector preferably also mounted on the base. The position of the injector, such as the orientation of the injector conduit for transmitting the drug relative to the array of transducers, is stored as a set of parameters (such as polar coordinates) in a computer memory for relating the conduit position to the intended area of injection. A system of this invention causes an ultrasound beam to scan the region to be injected such that an image of the scanned region (organ) appears on a video monitor. The image can be of the type that projects an array of images of "slices" of the organ such as disclosed in the referenced art. Also presented along with the image of the region is a virtual image of the injection conduit (such as a hypodermic needle) so that the user sees on the monitor an image of a "proposed" location as to where the conduit and particularly the tip of the conduit would be located in the organ if the conduit is advanced from a retracted position outside the body to its extended position whereafter the drug is discharged into the organ. The virtual image is created on the screen by storing in a section of memory coordinates of the virtual image relative to the scanner array. According to the method of the invention, the scanner-injector device is positioned so that the virtual image of the conduit is positioned at the desired location in the image of the organ represented on the monitor screen. Then the conduit is advanced into the body and the viewing system is activated to show the real image of conduit and the organ. When the conduit has reached its desired location as shown on the monitor screen, the user causes the drug to be injected through the conduit into the organ. Then the conduit is withdrawn thereby completing the procedure.

In another embodiment of the invention, a component of the beam from the ultrasonic array is focussed on an area of the organ including the intended location of the tip of the conduit before and/or during insertion of the injector and/or during passage of the drug through the conduit of the injector.

In yet another embodiment, the injector is provided with an ultrasonic "pump" at the drug supply end of the conduit so that sound waves conducted through the drug in the conduit are transmitted to the injection site as an aid to forcing the drug into the organ.

The methods and device of this invention may also be used as an aspirator by lcating a vacuum means at the entry end of the conduit and withdrawing fluid from the region of the body.

The advance of the injector toward the target may be controlled manually. Altrnatively, the extent and rate of advancement of the conduit toward the desired location may be programmed by a computer controlling a linear steppar coupled to the injector conduit.

BEST MODE OF CARRYING OUT THE INVENTION

Figure 1:
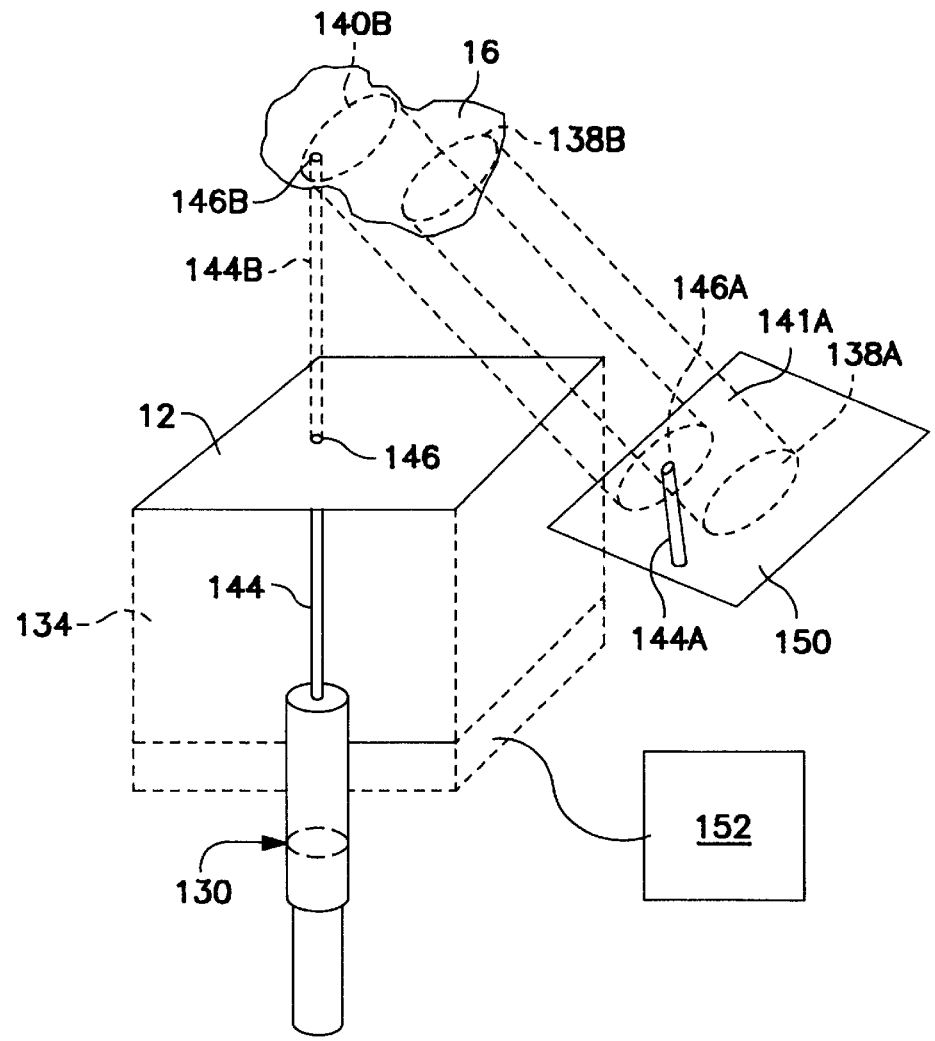
FIG. 1 shows the combination scanner-injector of this invention.

Turning now to a discussion of the drawings, FIG. 1 shows the combination scanner injector of this invention including a plane array of transducers 12 positioned on a base 134 and an injector 130, which in this embodiment is a hypodermic syringe also mounted on the base 130. The scanner-injector 130 is positioned with the scanning array 12 positioned against the abdomen of the user (not shown) and the conduit 144 of injector 130 is retracted out of contact with the patient but poised for the piercing and injection step. There is shown a computer system 152 including a video monitor 150 which projects an image of the subject organ 16 (e.g., the heart). The image 138A and 140A of the organ 16 is preferably projected as slices of the organ arranged to give a visual perspective in real time and in three dimensions. A phantom image 144B of the conduit 144 is shown which is the position that the conduit 144 would occupy if extended from its retracted position into the patient. A virtual image 144A of the injector conduit 144 appears on screen 150 showing where the tip 146 would be located if the conduit 144 were injected from its retracted position to its extended postion 144B. The position of the vitual image 144A of the injector is determined by coordinates in memory of computer 152 of the conduit relative to the fixed orientation of the 130 relative to the plane of array 12 and the preselected depth of penetration of the injector conduit 144 into the patient.

The operator moves the hand held base on the body of the patient and adjusts the preselected depth of penetration of the injector conduit until the tip of the virtual image on the monitor screen is exactly where it is desired to inject the drug. Then the operator causes the conduit to be inserted into the abdomen along the path of the phantom image 144B so that the injector conduit is located with its tip at desired location 146B. this positioning can be confirmed by examination of the virtual imagery on the screen. Then the drug is injected through the conduit 144 to the desired location.

Figures 2A, 2B:
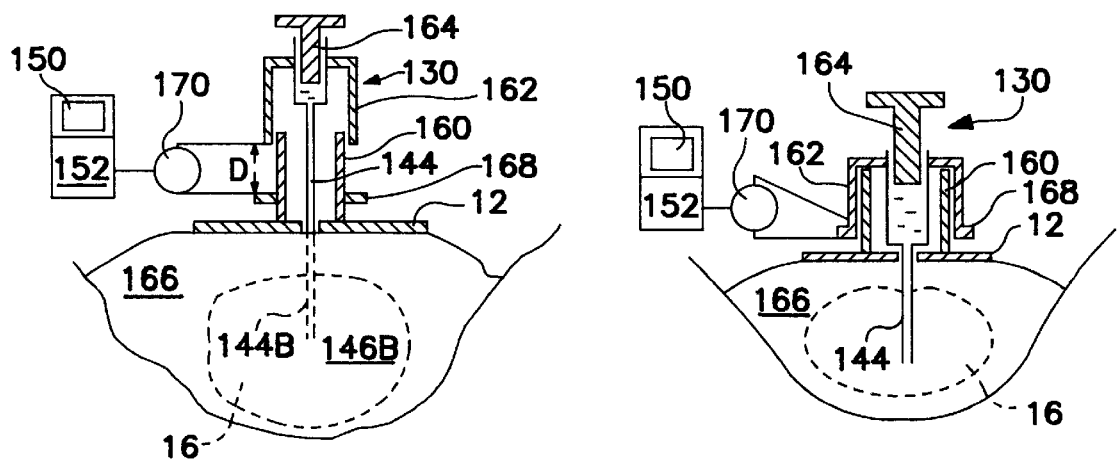
FIG. 2A shows a sectional view of the scanner-injector with conduit retracted.
FIG. 2B shows the scanner-injector with conduit extended.

FIGS. 2A and 2B are sectional views of one embodiment of the integrally combined scanner-injector for controlling depth of the conduit 144 into the patient. There are shown a base supporting transducer array 12 and upright tube 160 whose end telescopes into sliding tube 162. Barrel 164 of hypodermic syringe 130 is securely mounted on sliding tube 162. FIG. 2A shows the conduit 144 in the retracted position and FIG. 2B shows the conduit penetrating the patient 166 into organ 16. the depth of penetration D is determined by the location of adjustable stop 168 slidably positioned on vertical tube 160 and the value of D is transmitted by sensing circuit 170 to computer 152. The value of "D" together with the coordinates relating the orientation of injector 130 relative to array 12 are used to project the virtual image of the injector conduit on the screen of monitor 150 as discussed above FIGS. 2A and 2B also illustrate the use of the apparatus as an aspirator for removing body fluids around infected organs or for removing the ambiotic fluid from pregnant women. This apparatus and technique is especially important for avoiding sticking the fetus which presently happens in about 15% of the cases. According to the method of the invention, the scanner is positioned on the patient's body such that the image of the expected position of the conduit prior to insertion of the conduit is projected on the screen. The scanner is then positioned such that the image is in the desired location as shown in FIG. 2A. Then the conduit is injected as shown in FIG. 2B and the plunger 222 is withdrawn thereby aspirating body fluid from the region of the body surrounding the tip of the conduit.

Figure 2C:
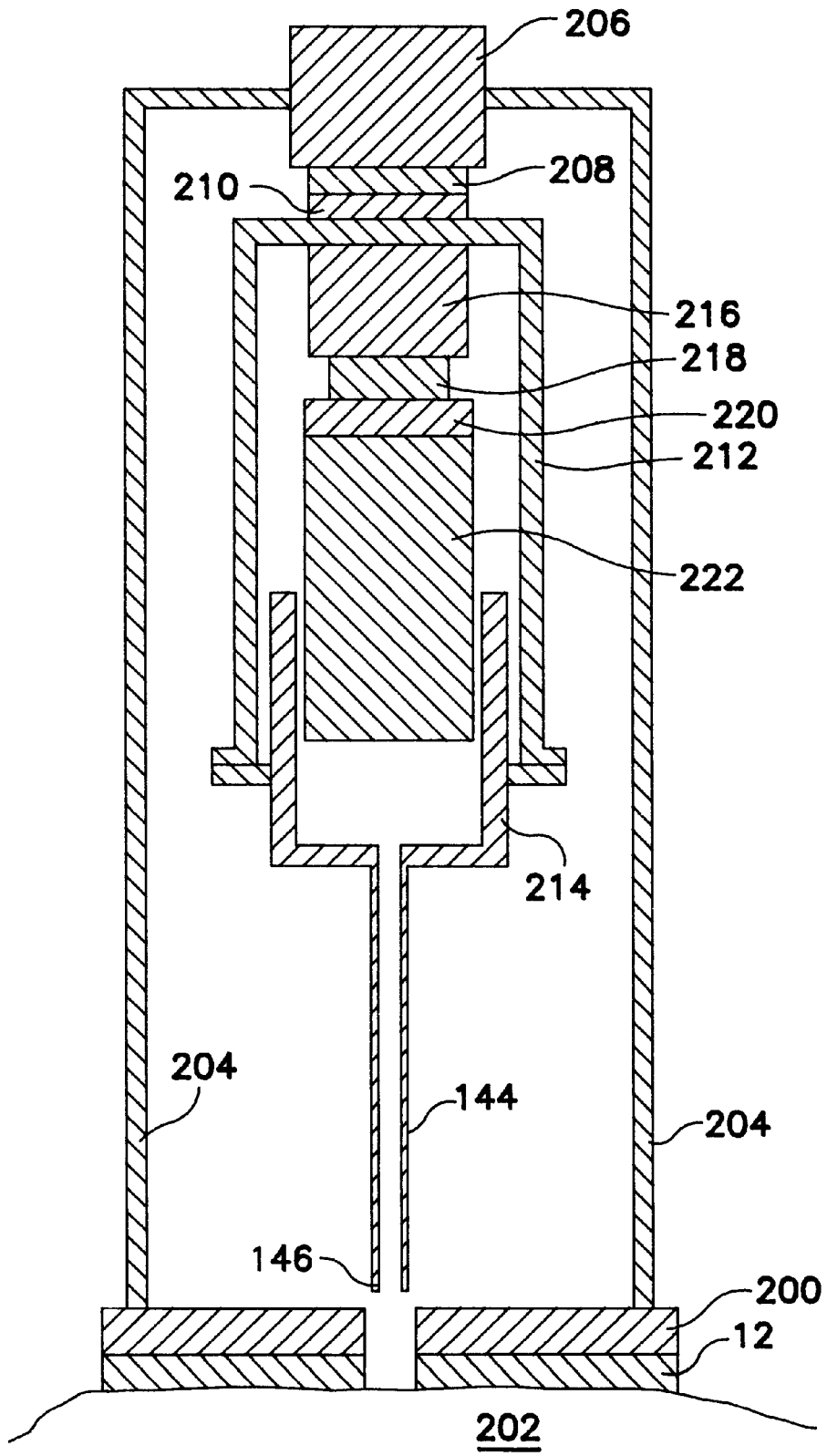
FIG. 2C shows the scanner-converter with ultrasound stimulation.

FIG. 2C is another schematic diagram of another embodiment of a combination scanner-injector of this invention. The device is shown with a transducer array 12 mounted on a base 200 and positioned against the patient 202. A brace 204 has one end mounted on base 200 and another end supporting a linear stepper transducer 206 having slidingly positionable actuating member 208. An ultrasound piezo member 210 has one face mounted on actuating member and an opposite face supporting a brace 212 that supports the barrel 214 of a hypodermic syringe. Another linear actuator 216 is also supported on brace 212 and has another slidably positionable actuating member 218 supporting another piezo electric member 220. The plunger 222 of syringe 214 is supported on a side of the other piezo member 220 opposite actuating member 208. Linear stepper transducers are well known in the art such as those having a voice coil and used in disk file technology.

According to the method of using the apparatus of FIG. 2C, when the scanner injector combination has been positioned and the depth D of injection has been selected and posted in the computerized controller (not shown), the linear actuated 206 is activated causing the injector conduit 144 to penetrate the body 202 of the patient to a depth D. Simultaneously, (and optionally) pieao element 210 is activated so that ultra sound waves are transmitted through the barrel 214 to the end 146 of the conduit 144 thereby facilitating piercng the region 202.

After the conduit 144 has been positioned with the exit end 146 at depth D, linear actuaor is activated by computer control to force plunger 222 to inject the prescribed dose of drug. While the drug is being discharged, piezo 220 is activated sending an ultrasonic wave through the drug such as to facilitate entry of the drug into the intnded region of the patient.

The following paragraphs are excerpts from copending application Ser. No. 08/393,568 of which the present application is a continuation-in-part.

The best presently known mode for providing a system for storing ultrasound signals where each signal originates from a location in the heart (or organ being studied) and the entire collection of signals originates from the entire region occupied by the heart and uses selected signals to construct a display of slices of the heart on a monitor such as to present an impression of a three dimensional view.

Figure 3A:
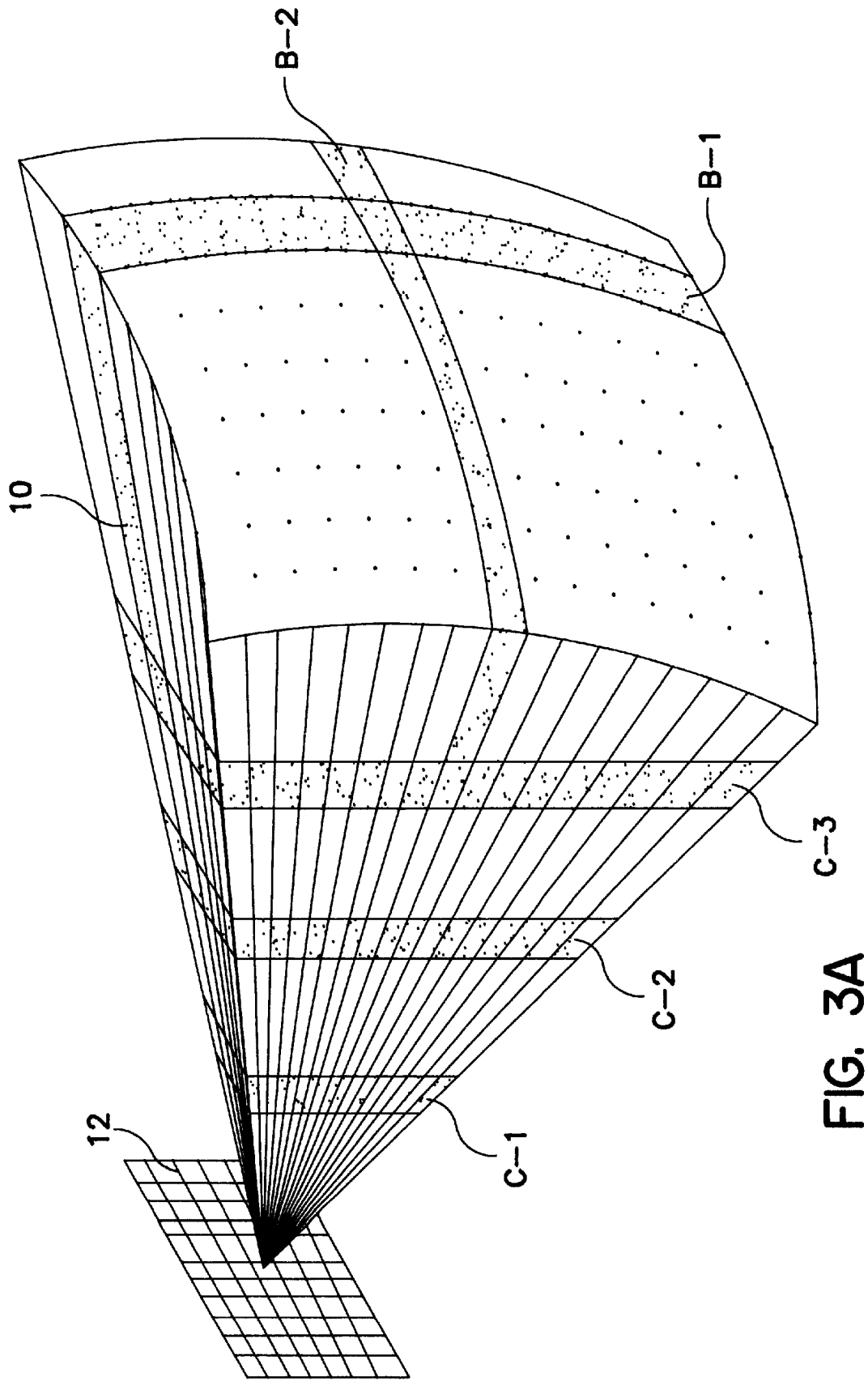
FIG. 3A shows multiple B and C slices.
Figure 3B:
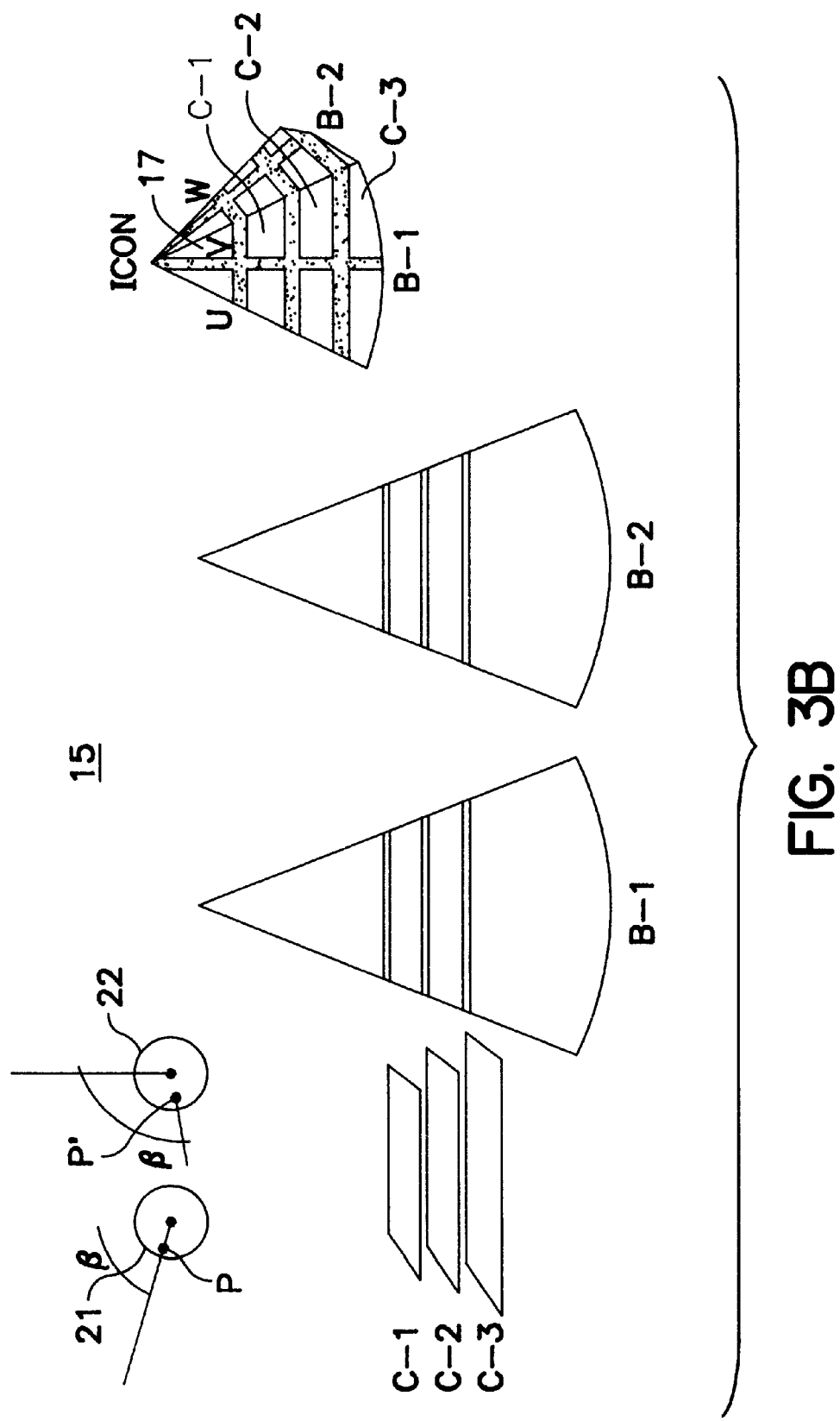
FIG. 3B shows scans and icons displayed on a monitor screen.

FIG. 3A shows five slices including three C-scans, (C1, C2, C3) and two B-scans (B1, B2) through the pyramidal volume 10 generated by array 12. FIG. 3B shows one object of the invention which is to display the slices (cross section) shown in FIG. 3A on a monitor screen 15 simultaneously in real time and in relation to one another as in the object. Only three C slices are shown but it may be understood that a larger number may be shown. The advantage of this display arrangement is that the physician can study the structural relations between various parts of a three dimensional object. If the object is moving and the cross sections are shown in real time, then the viewer can study the dynamic relation between the parts.

An icon 17 is also shown which is activated by a track ball to select the slices. The icon 17 is a pyramid with which parameters associated with the selection of the slice are positions along the edges of the pyramid.

Another pair of icons, 21 and 22 are used to select the view direction. Point P (FIG. 3B) is activated when it is desired to view the slice from one side. Point P' is activated when it is desired to view the slice from the opposite side. The distance from the center of the respective circle selects a value cos β where β is the angle that the view direction makes with the slice and the rotational position of P or P' marks the angular position of the view direction.

Figure 4:
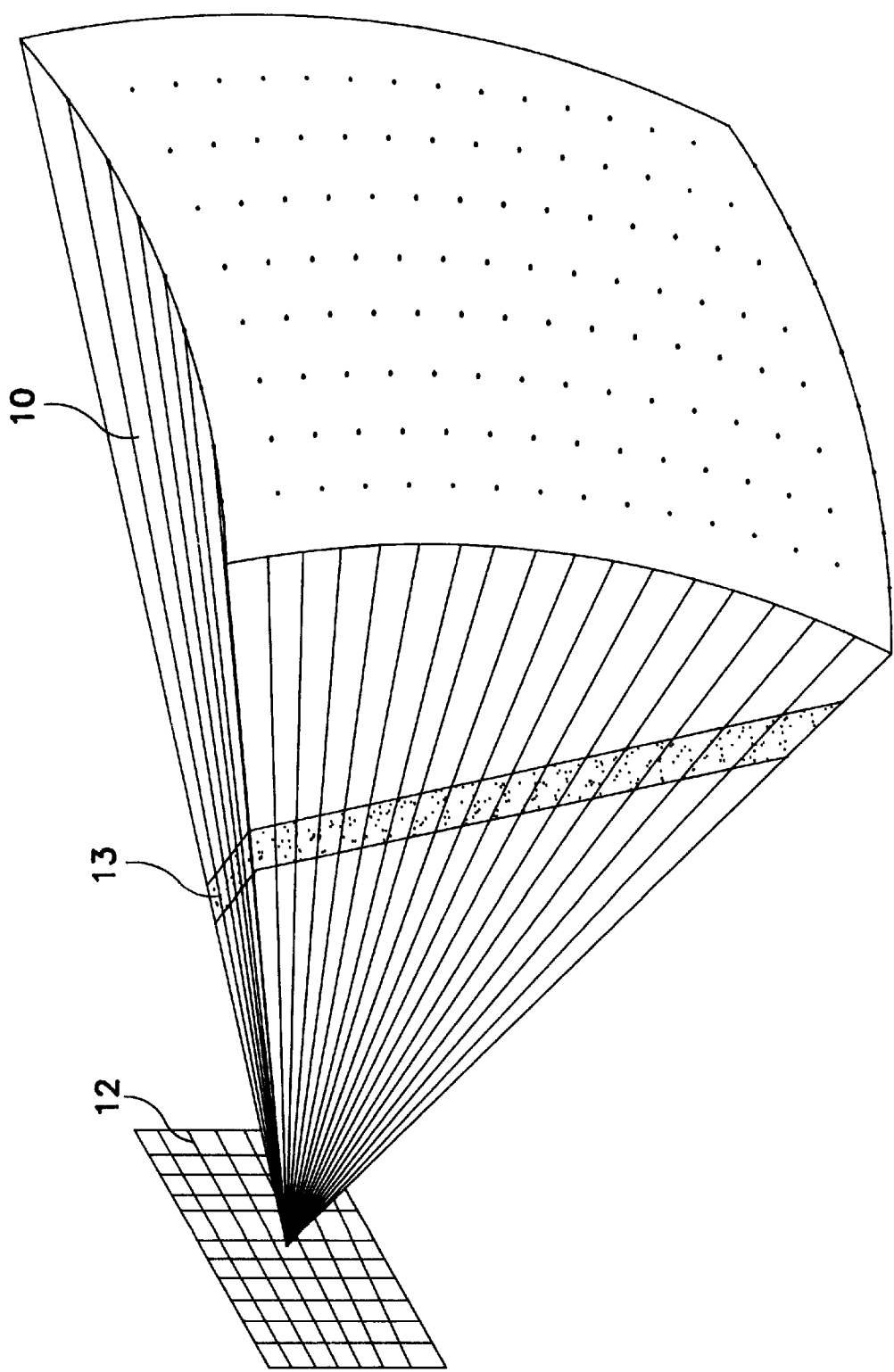
FIG. 4 shows an inclined slice for producing an I scan.
Figure 5:
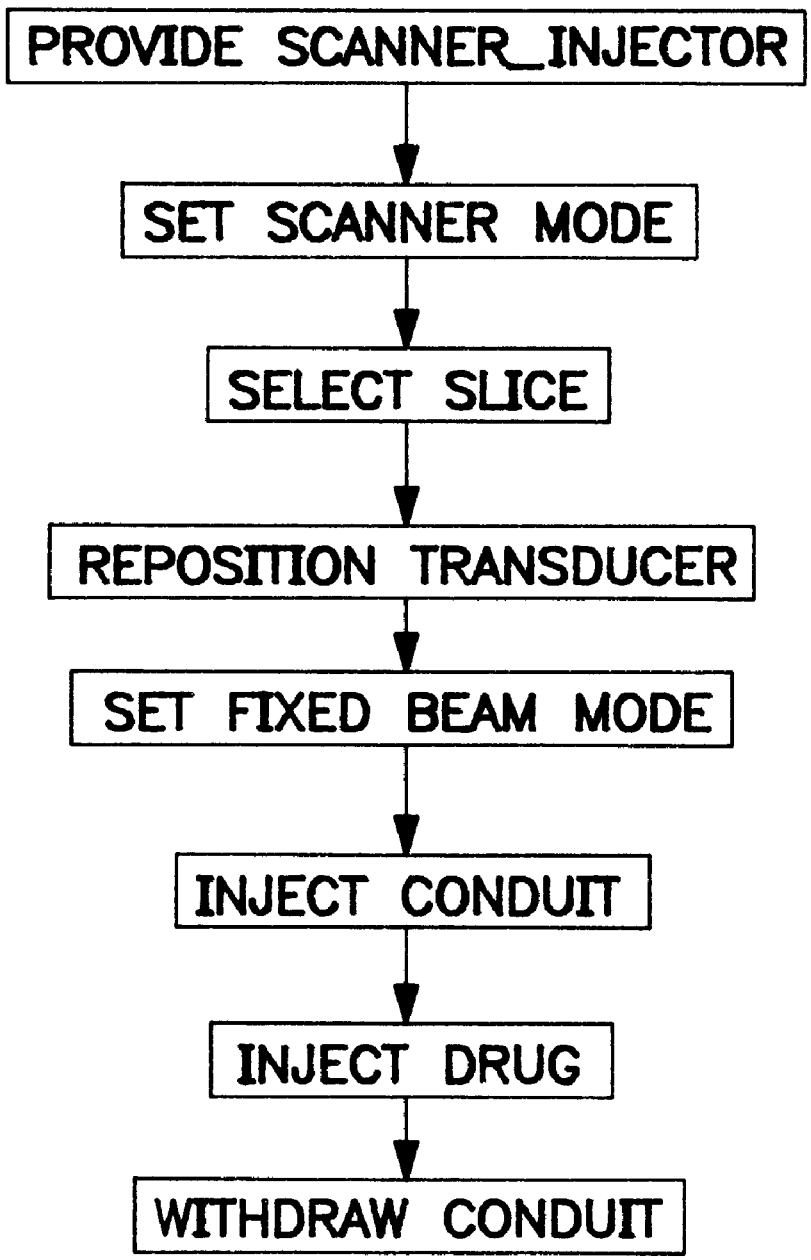
FIG. 5 shows a flow chart of the injection process.
Figure 7:
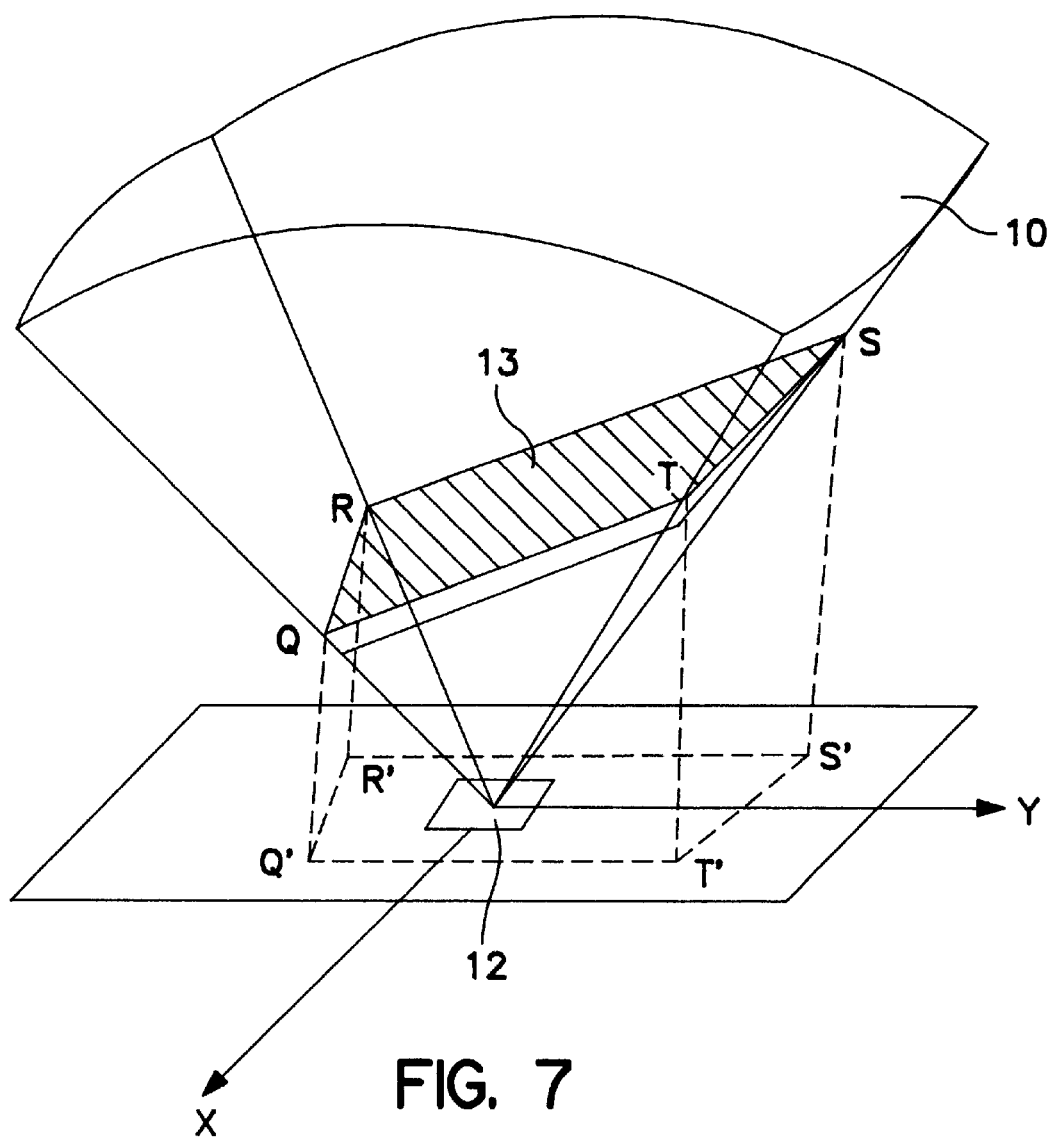
FIG. 7 shows an I slice projection on a hypothetical plane in which the hypothetical plane is in the plane of the transducer array.

FIG. 7 shows the principle of the display projection in which the inclined slice 13 of FIG. 4 is shown with the transducer 12 lying in the hypothetical plane below the pyramidal scan volume 10. In the simplest display implementation, each point in the desired I-scan Q, R S, T is projected back onto the hypothetical plane (which is also the x,y plane in the example of FIG. 7) to form the projected image, Q',R',S',T'.

Figure 8:
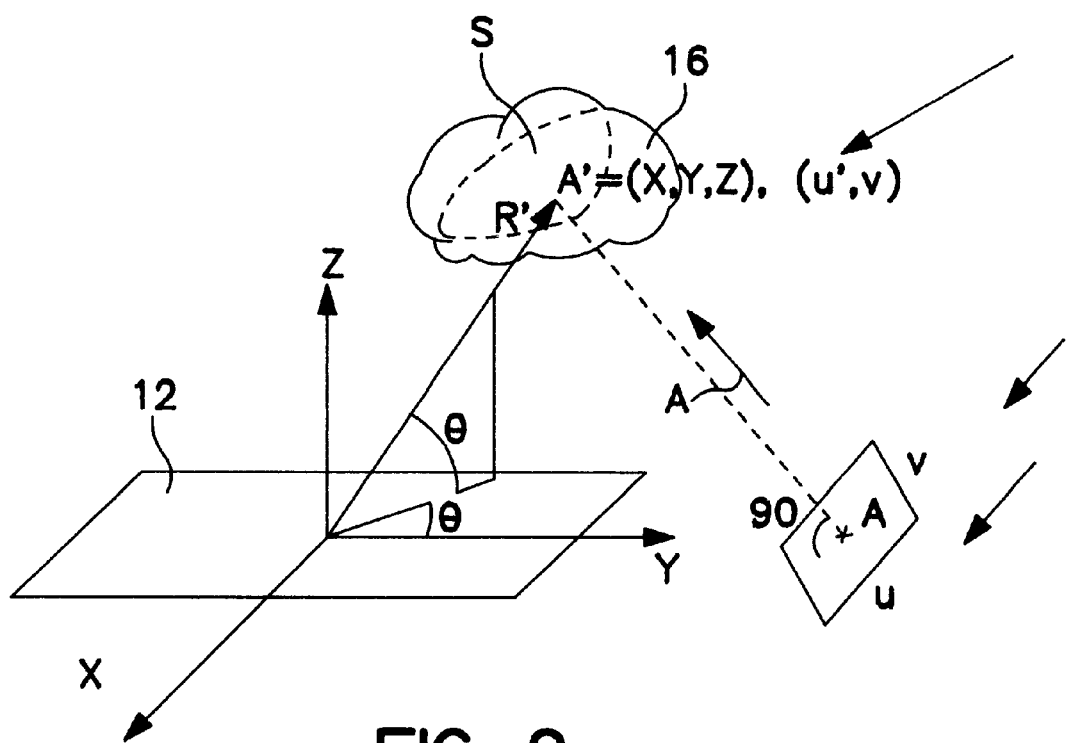
FIG. 8 illustrates the affine projection of a point in object space onto the hypothetical plane.

FIG. 8 illustrates the more general version of the invention incorporating the principle of the general projection commonly known as the "affine" transform and described by Foley et al. FIG. 8 shows a point A' in the object 16 at coordinate position x,y,z, corresponding to polar coordinates R,∅, θ having an origin in the center of the transducer array 12. Location A' is also defined by rectangular coordinates u',v' which lie in the plane of the slice so that u',v' are expressible as functions of R,∅,θ subject to the selection of the slice by the operator. The operator also selects a view direction (see arrow) which thereby define a hypothetical plane containing coordinates u,v which are expressible as functions of u',v' depended upon the selected view direction and are therefore expressible as functions of R,∅,θ. Location A' is projected onto the hypothetical plane. The hypothetical plane, u,v corresponds directly to the display plane. FIG. 8 also illustrates by vector representation that the echo data generated as a reflected intensity from location A is transposed as brightness to pixel A' on a display plane. The azimuthal angle θ and elevational angle ∅ are defined relative to the x,y plane which is the plane of the transducer (the reference plane). The hypothetical display plane is a mathematical concept introduced in order to visualize the mathematical relationships to be presented. The slice having a boundary S includes a plurality of locations A' and has an orientation and position selected by the user to intersect the object. The pixels located on the display screen at u,v have a brightness corresponding to the echo data generated at point A' on the scan plane in object space when the array is focused on point A'.

Figure 6:
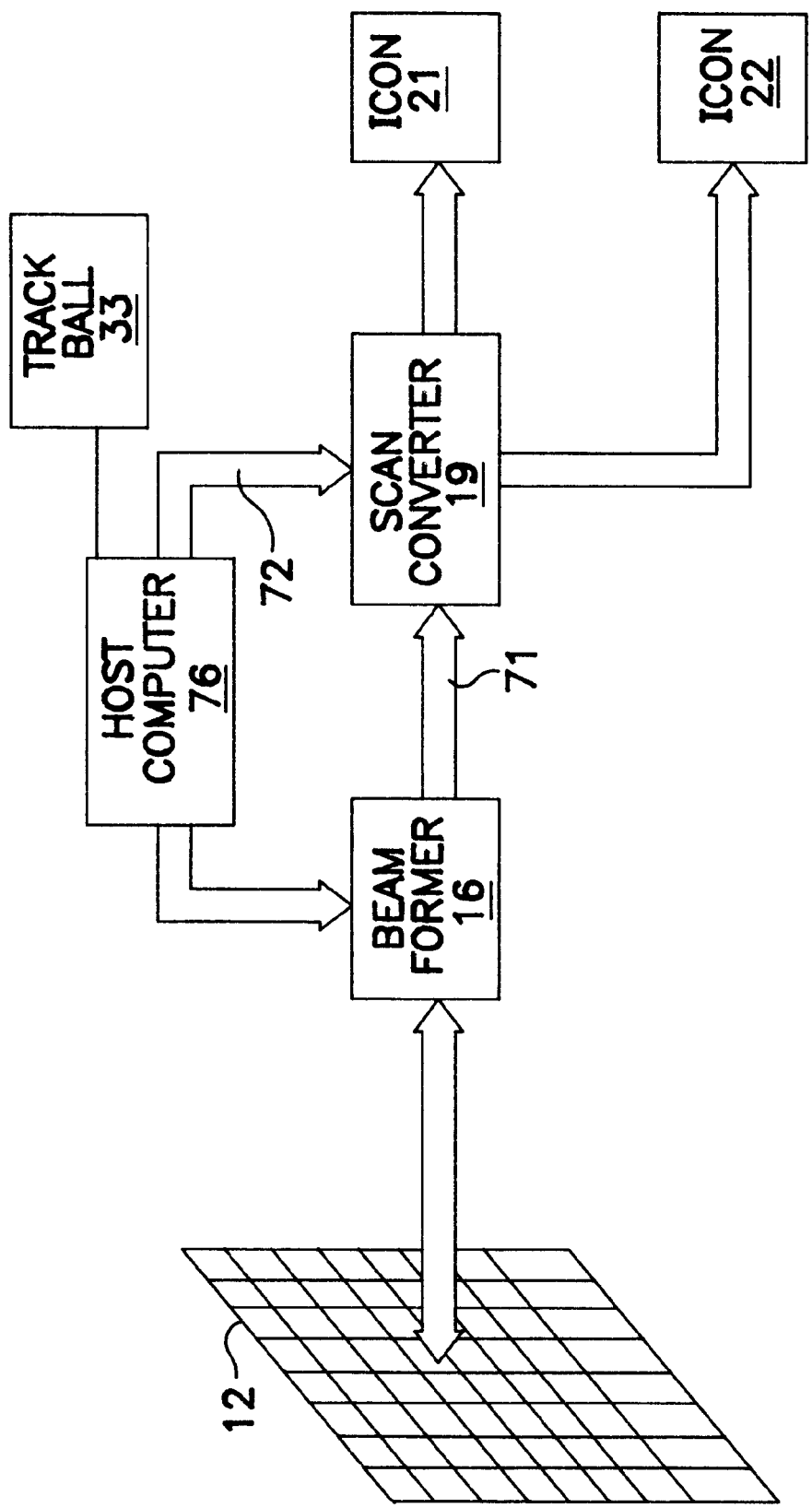
FIG. 6 shows a block diagram of the invention.

The next topic in discussing the embodiments of the invention is the selection by the observer of the slice through the object to be viewed. The slice has a finite thickness. In order to define the the orientation of the slice, we will assume that the thickness is small relative to its distance to the transducer plane. Slice selection is carried out by the operator using a pointer such as the operator controlled select device (not shown) of the host controller 76 of FIG. 6 combined with the pyramidal icon 17 in the display of FIG. 3B. Under interactive software using the light pen or track ball the operator indicates three points on the display screen icon 17 such as points U, V, W, on slice C-1 in FIG. 3B. The three points in the icon 17 correspond to three points in the pyramidal scan volume U=x1, y1, z1
V=x2, y2, z2
W=x3, y3, z3

The three points define the first selected C-plane, i.e., plane C-1 in FIG. 3B. Any selected scan plane is uniquely defined by the three points which are used to find the coefficients of the equation of any selected plane in the object volume. According to the well known principle of three dimensional analytic geometry as exemplified in the text by Chisholm and Morris, solution of the determinant:

$$\begin{vmatrix} x & y & z & 1 \\ x1 & y1 & z1 & 1 \\ x2 & y2 & z2 & 1 \\ x3 & y3 & z3 & 1 \end{vmatrix} = 0$$

yield the general equation of the plane $$ax+by+cz+d=0$$

where a, b, c, and d are constants derived from the determinant by well known mathematical procedures. Analogous procedures are carried out to define the incline scans. It should be noted that, in fact, C-scans parallel to the face of the transducer, the XY plane can be determined by a single constant z=k. In addition, multiple C-scans are then defined by z=k. The same is true for B-scans perpendicular to the transducer which have equations y=k' and x=k".

An alternate definition of the plane ax+by+cz+d=0 also exemplified in the text by Chisholm and Morris is determined by the orientation of the orientation vector <a,b,c,> which is normal to the selected plane which passes through a desired point (xo, yo, zo,) which can be determined by a second vector, i.e., the translation vector.

The result of one implementation of this projection is illustrated in FIG. 3B by the stack of C scan images which undergo shear in the display in accordance with the option of the viewer to view the slice from different view directions.

In the more general implementation, each point in the selected scan is projected orthogonally onto a hypothetical plane at some angle to the slice wherein the slice is an I plane.

Figure 3C:
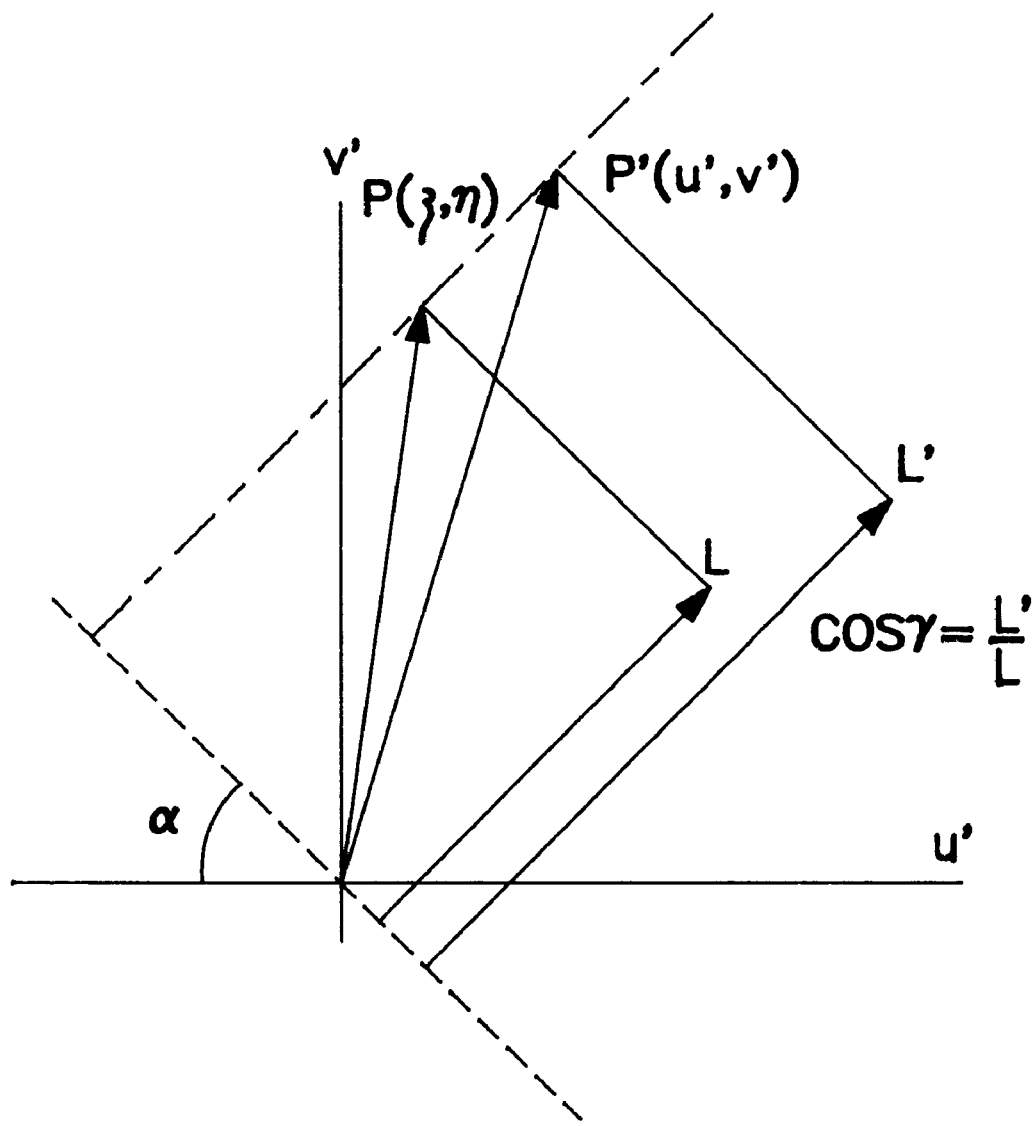
FIG. 3C illustrates the operation of tilting the hypothetical plane (shifting the view direction).

FIG. 3C illustrates the operation of selecting the view direction of locations on the hypothetical plane (and display plane). The operation involves transferring data initially located in addresses of the scan converter memory corresponding to a set of rectangular coordinates, u',v' on the cross section (slice) to new addresses ($\xi,\eta$) which are modified according to the operator selected angles $\gamma$ and $\alpha$ where $\gamma$ is the angle which the hypothetical plane makes with the slice and $\alpha$ is the angle which the intersection of the hypothetical plane with the slice makes with the u coordinate on the slice.

The operation on the coordinates u,v on the cross section is illustrated in FIG. 3C where location P' is shown initially having coordinates u',v' but because of the change in the perspective direction, P shifts to P' having coordinates $\xi$, $\eta$ where $$\xi = u' + (\cos \gamma - 1)[u' \sin^2 \alpha + v' \sin \alpha \cos \alpha]$$

and $$\eta = v' + (\cos \gamma - 1)(u' \sin \alpha \cos \alpha + v' \cos^2 \alpha)$$

$\xi,\eta$ is the new location to where echo data is moved in a buffer memory that was originally stored in address u',v'.

Referring to FIG. 3C, result of the operation is to shrink dimension L' to L.

We now discuss the hardware and steps involved in creating the image (in C scan, B scan or I scan format) of the cross sections selected by the operator. The major parts of the invention are represented in the block diagram of FIG. 6. The beam former 16 (signal processor) receives a "total" electrical signal from the array 12 responsive to the reflected wave from object space. The beam former 16 has an array of delays, A/D converters and adders which resolve the total signal into sets of intensity signals using techniques described in U.S. Pat. No. 4,694,434 which has been incorporated by reference into this specification. Conditioning of the delays to generate each intensity signal and association of each intensity signal with the correct location is accomplished by input to the beam former 16 from host controller 76. Each intensity signal is the signal generated by a reflected wavelet from a set of wavelets. Each set of reflected wavelets originates from a focal region defined by a single transmit beam intersecting a selected cross section. Each wavelet is a reflection of the transmit beam from one of sixteen focal locations in the focal region. More or fewer than sixteen focal locations are included as possible variations.

Figure 9:
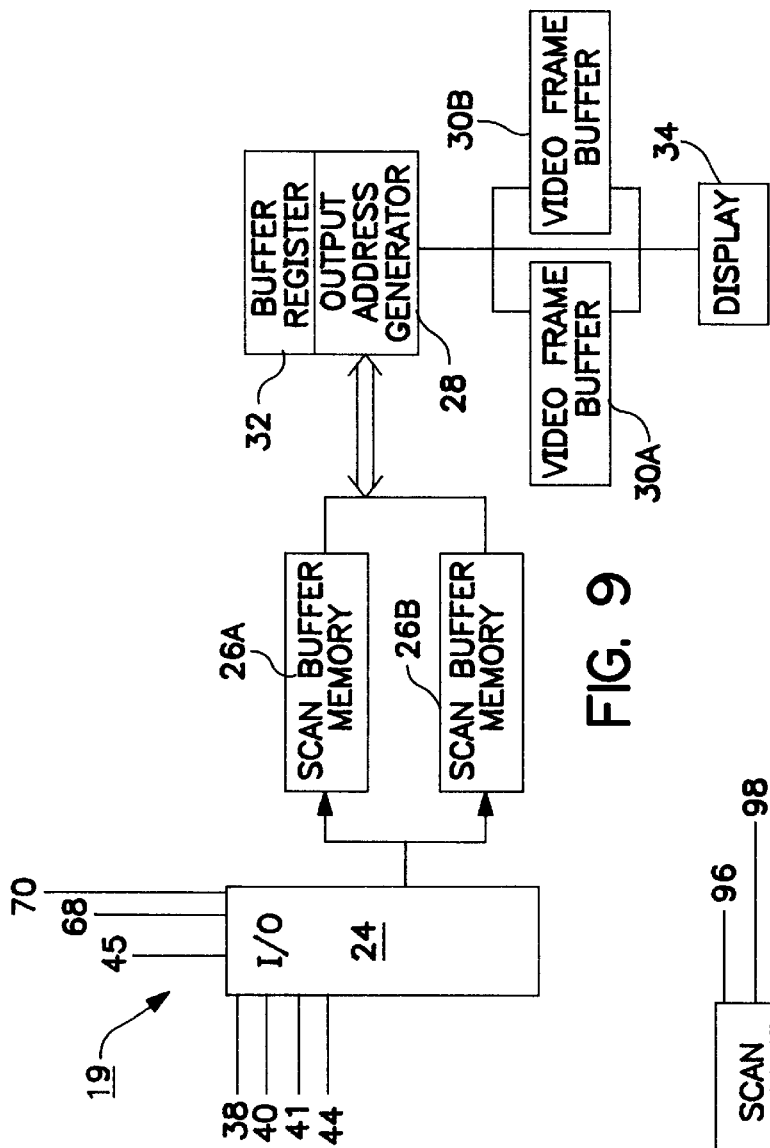
FIG. 9 shows components of the scan converter.

Each intensity signal and its location in object space expressed as R, $\theta,\emptyset$ coordinates is digitized by the beam former 16 and presented in real time on bus 71 to a scan convertor 19. Component parts of the scan convertor 19 are shown in FIG. 9. The digitized intensity signal and its coordinates is directed by an I/O controller 24 for storage into either one of scan buffer memories 26A or 26B I/O controller 24 has a switch which directs incoming data to refresh one buffer memory (26A or B) while the other buffer memory is being read out for display.

Parameters determined by the selection of the slice and the orientation of the hypothetical display plane (the view direction) are stored in the host controller 76 by the operator using an operator controlled device 33. Coordinates $\xi,\eta$ are stored by the output address generator 28 in buffer register 32. Then output address generator 28 performs an affine transformation on coordinates u'v' which transforms them into "pointer" coordinates r'$\emptyset\theta$'.

Scan buffer memory 26A or B is addressed by transform coordinates r'$\emptyset\theta$' so that the intensity signal in location r',$\emptyset$',$\theta$' of the scan buffer memory 26A or B is stored in location $\xi,\eta$ of the video buffer memory where it awaits display on the monitor screen.

Having described in the foregoing paragraphs the geometrical relationships between the transducer array, the slice being imaged and the screen (hypothetical plane) by which an image of the slice is projected onto the screen, there remains the job of superimposing onto the screen a virtual image of where the tip of the injector conduit will be located in the organ. This is acdomplished by noting that, with the injector conduit 130 normal to array 122 and intersecting the origin (x=0, y=0) The injector conduit 144 coincides with the "z" axis. Therefore, the only variable is the depth of penetration D which is preselected as discussed above. Then at memory addresses corresponding to $\Theta=0$, $\emptyset=\pi/2$ and R ranging from R=0 to R=D, an intensity value cooresponding to a bright spot is stored which changes location in memory only when D is changed by the operator. Thus, according to a method of the invention, the operator selects his slices and adjusts their position on the screen and adjusts the depth D prior to injection such that the spot on the screen falls at the desired location on the images. Then he causes the conduit to be injected to a depth D in the patients body and then causes the drug to be injected at the desired locaition.

In another version of the method and apparatus of the invention, the beam control has two modes. One mode is the scanning mode in which the scanning ultrasonic beam scans the entire region of interest and the slices of interest and location of the drug injection site is selected as discussed above. The second mode is the fixed beam mode which is activated just prior to, during or after the drug is injected into the lodcation. In this mode, at least a portion of transducers do not participate in the scanning operation but instead are fixed to direct a constant ultrasonic beam onto the region enclosing the injection location 146B so that this region is stimulated by the focused beam to relax the region, and open up passageways that are receptive to the admission of the drug to be injected. This method differs from the prior art of shock induced drug admission in which the drug is first injected and then force waves radiated from horns are used to direct a shock wave against the treated area. Accordingly, the steps of the method are listed in FIG. 13 and as follows:

Step 1: A combination scanner-injector is provided such as described in this specification.

Step 2: The beam generator is set in the scanning mode and beam scans the entire volume of interest;

Step 3: Slices of the region of interest are selected and projected onto the monitor screen along with a virtual image of the injector conduit and the selected location for injeting the drug;

Step 4: The position of the transducer is adjusted and the depth of injection of the conduit is selected such that a virtual image of the injector conduit and the selected location and the slices are presented on the monitor screen.

Step 5: The beam generator is set in the fixed beam mode with the fixed beam directed toward the selected location;

Step 6: The injector conduit is extended with the exit end of the injector conduit positioned at the selected location with the beam generator continuing to direct the beam to the location of interest;

Step 7: The drug is injected through the injector conduit to the selected location while the focused beam continues to irradiate the selected location and surrounding region.

Step 8: The injector conduit is withdrawn.

Step 8: (optional) The beam continues to irradiate the selected location after the injector conduit is withdrawn.

As discussed below, additional operations may include decimation, resampling (either a filtering process or interpolation depending upon the range. From the frame buffer, an image processing microprocessor, such as the Intel 1860, can be programmed to perform image analysis functions. Well-known examples include online and off-line calculations of length, circumference, area and volume using standard algorithms from freeze frame data. The video frame buffer also outputs data to the display monitor.

The following paragraphs discuss the design considerations of the core of the scan conversion of data in real time from R., θ,∅ format to u,v format (rectangular coordinates) with many user selectable (in real time) simultaneous B scans and C scans and I scans. The problem has two parts: storage of data and transformation of the viewing space. In an example implementation, the memory organization for the storage of one pyramidal volume is 4096 lines (in a 64×64) grid with 512 samples per line. In this example, lines of echo data are obtained in 16 simultaneous directions for each transmit acoustic pulse using our previously disclosed 16 to 1 receive mode parallel processing. The 16 lines of envelope detected echo data are digitized in the beam former 16 at a typical rate of approximately 3 mhz or greater and controlled by the Sample Clock and transferred to the I/O Controller 24 of the Scan Converter 19. Echo data from a volume of object space traversed by transmit beams during one scan cycle is stored in the Scan Data Buffer memory in an R, 0, 0 format. This allows data to be written directly from the detected output of the phased array volumetric scanner 16 into a memory without conversion. As a line of the scan is being formed, it is first tagged with its θ and ∅ orientation which determines the 512 sample long column of the 64×64 grid. the line is then digitized and read into the memory with locations in the column corresponding to the range of the data.

A volume of data is transferred to the scan converter 19 via the 16 byte wide, 3 mhz video bus (48 MBytes/sec). Sixteen columns of an R, θ,∅ memory with the same organization as the buffer memory are filled simultaneously. This requires a 2M byte memory to be filled in less than 1/30 sec. The Scan Data buffer memory 26 has two such volumetric memories, A and B, as shown in FIG. 9. This allows one memory to be filled in less than one cycle while the data in the other memory is processed. An interlock between the memories prevents a volumetric memory from being operated on while it is being written.

One hundred and twenty eight 8×32k static random access memories (SRAM) are used for each of the two volume memories. Each memory location in the Scan Data Buffer Memory 26 A, B is specified by a 32 bit memory address received from the I/O Controller 24. Because of this organization any R,θ,ϕ voxel can be addressed in a single cycle.

Two approaches to the affine transformation are possible. The first is to transform the selected planes from the pyramidal volume which are R, θ, 100 format for the C scans to predetermined u,v, locations on the display as shown in FIG. 8. While this works logically, it is suboptimal from an implementation standpoint because a singe point in data space can map to more than one point in the display space. Resolving this situation in the viewing transformation requires a variable number of calculations which is difficult to pipeline. A better approach is to map the display to the data space. This mapping has the effect of translating the u,v, addresses of the display into the R,θ,ϕ address spaces of the planes that are selected for view.

Two transformations occur in the Output Address Generator 28 shown in FIG. 9. The first is the general affine transformation which translates the positions of the u,v, display into the x, y, z representation of the volumetric data. Affine transformations are described, for example, by Foley et al. In affine transformations, parallel lines stay parallel and the relative size of objects remains unchanged.

Secondly, since the volumetric data is in reality R,θ,ϕ space, a rectangular to polar transformation is further required to transform the u,v representation of the display to the polar coordinates of the volumetric data, the result of the two transformations is that multiple independent views, each of which represents a plane through the volumetric data are created in the display space. The pixels in each of these views have R,θ,ϕ address translations.

In the preferred implementation, the scan converter will have several independent views into the volumetric image. By manipulating the icon on the Hose Controller., the user can choose he location in the volume from which these windows are getting their data. The entire display is transformed in 1/30 the of a second. Since the user has control over which planes are displayed via icon(which controls the constants in the affine transform) responsive interactive control can be maintained.

By scanning out the display space (pixels of which now contain the R,θ,ϕ address translations of the appropriate data in planes of the volume) in raster format, the image planes that belong in the various independent view a that have been created can be accessed at a rate of one voxel per cycle so that one pixel per cycle of the display can be sent to the monitor.

The scan converter shown in FIG. 9 naturally falls into two parts based on clocking and minimum interconnect: a Scan Buffer Memory and an I/O Subsystem. The I/O Subsystem includes four modules: the I/O Controller 24, the Output Address Generator 28, the Video Frame Buffer 30A, the Display Output 34, the Scan Data Buffer 26 has no connection to the rest of the 3D Ultrasound machine except for power. It is completely synchronous with a single Scan Converter clock. The I/O Controller 24 reads and writes the Input Volume, while the Output Address Generator 28 reads the Output Volume. The I/O Controller 24 connects to the beamformer bus 71 to synchronize the ultrasound data to the scan converter clock. It also connects to the bus 72 from the Host Controller 76, the I/O controller 24 writes the ultrasound data to the Input Volume in the Scan Buffer 26 A, B.

As shown in FIG. 9, inputs 38 to the I/O Controller 24 from the Beam Former include sixteen 8 bit busses (16 bytes) to transfer the digitized ultrasound echo data through the I/O Controller to the Scan Data Buffer memory. Other inputs to the I/O Controller include (a) the Sample Clock 40 from the Beam Former 16 which may operate at a frequency up to 25 mhz. (b) the Display Time Flip Flop[(DTFF) 42 which is enabled in the Beam Former 16 during reception of the echo data to the transducer and indicates to the Scan Converter what valid data exists on the Beam Former data bus. The Scan Converter asserts Scan Converter Busy to signal the Beam Former 16 that it has not completed converting the previous frame and therefore cannot swap the current frame buffer. This means that the beam former must not start any new lines until the scan converter negates the Scan Converter Busy 44 which signals the Scan Converter has completed converting the previous frame, and has started converting the current frame. This means that the Beam Former 16 is now free to continue transmitting.

FIG. 9 also shows the connections from the Host Controller 76. The Scan Converter 19 will be a 32 bit slave module to the Host Controller. The Scan Converter 19 requires an address to identify which rays are being imaged, since the beam former 16 may not form the image sequentially. For the example implementation of 64×64=4096 echo data lines, if one does not count the 16 to 1 parallel receive mode processing, there are 16 possible sample locations each in the 0 and 0 directions., therefore eight address bits are required for the C-scan mode. The scan converter I/O control 24 will include this 16 bit register. Scan Data Address 45 which includes the address bits. This register will be double-buffered. The scan converter 19 will read the buffer at the beginning of each ray and the Host Controller 76 has from the beginning of that array until the beginning of the next ray to write the new address. The I/O Control 24 also receives from the Host Controller 76 location and spacings on the display screen of each desired window, i.e., uo, vo, u, v, w,. The scan converter 19 will generate two interrupts: the vertical blanking interval 68 and Start Conversion 70.

Figure 10:
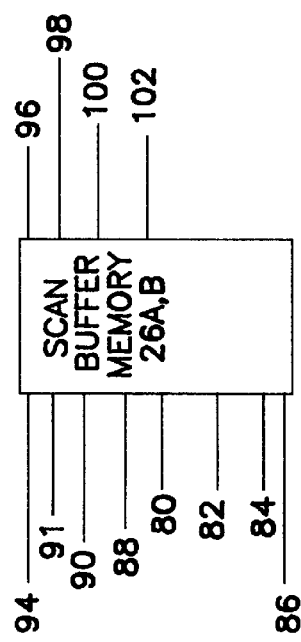
FIG. 10 shows connections of the scan converter from the I/O controller and to the output address generator.

FIG. 10 is an expanded view showing connections to the Scan Data Buffer Memory 26 A, B with its I/O and Control signals from I/O Control 24 and Output Address Generator 28. The I/O Controller 24 may send three address values and two control signals to the Scan Data Buffer 26 A, B every clock cycle. A bidirectional; 26 byte data bus connects the I/O Controller 24 and the Scan Data Buffer Memory 26. Sixteen 8 bit ultrasound samples on input 86 corresponding to 16:1 parallel processing may be written to the Scan Data Buffer Memory 26 A, B or read from the Scan Data Buffer 26 A, B every clock cycle, with some constraints. The sixteen samples have the same Radius Address and φ addresses 0, 1, 2, 3 and have θ adress=0, 1, 2, and 3.

Radius Address 80

Radius is a 9-bit register, selecting 1 out of 512 possible values of 0 address for the C-scan of I-scan data format.

The φ Address 84

φ is a 6 bit integer selecting 1 out of 64 possible values for the C-scan or I-scan data format.

Select input volume A, line 88:

The I/O Controller 24 asserts this signal when vol A is the Input volume. This signal signifies that the I/O Controller 24 will read or write Volume A., while the Output Address Generator will read Volume B. The I/O Controller 24 negates this signal for the opposite case.

Write Enable 90

The I/O Controller 24 asserts this signal: for a single clock cycle for each 32-bit data sample to be written.

Read Enable 92

The I/O Controller asserts this signal to read the d 4-data samples addressed by R,θ,φ. The I/O Controller shall never assert both Write Enable and Read Enable in the same clock cycle.

IOData Bus 86

The bidirectional IOData Bus contains 16 each 8-bit data samples.

Scan Converter Clock 94

The I/O Controller provides the Scan Converter Clock which is nominally 25 mhz. The Output Address Generator (OAG) 28 sends 4 values to the Scan Data Buffer Memory every clock cycle to select output phases.

OAG RADIUS 96: Radius is a 9 bit two's complement integer. There Are up to 512 samples in a line of 9 bits.

Max Radius 98

MaxRadius is a 9-bit integer. It is the largest radius address that holds valid data. The Scan Data subsystem clips radius data greater than MaxRadius.

OAG φ: 100

OAG θ 102

For C-scan data, both φ and θ are 9-bit 2's complement values.

(64 lines/60)*360=384 lines

Therefore, 9 bits of integer are required to capture all possible angles. φ and θ must be two's complements numbers.

Figure 11:
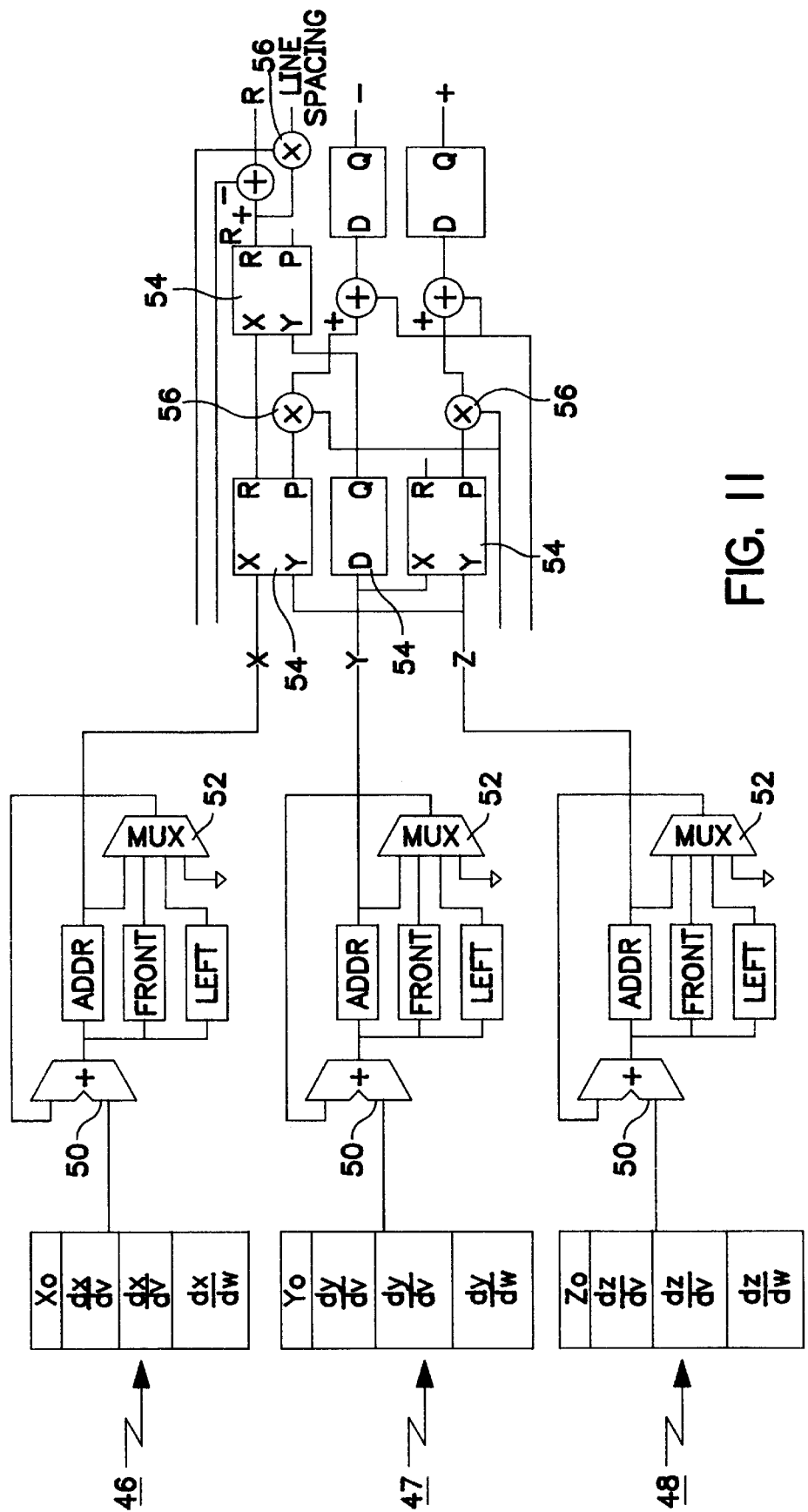
FIG. 11 shows the affine transform blocks of the affine transform generator.

These address of the video output data are generated in the Output Address Generator 28 by means of the affine transform followed by rectangular to polar coordinate transform as shown in FIGS. 11 and 9. These transforms constitute the mapping of display space into object space. FIG. 9 shows the OAG buffer register 32 which receives from the Host Controller 32 the coordinates of the C-scans, I-scans or B-scans selected by the user via the icon. The data correspond to the translation and orientation vector of the selected plane as described above. For each selected image plane through the pyramidal volume, the Host Controller 76 transfers the following data words to the Scan Converter 19.

(a) xo, yo, zo which locate the center of the selected plane in the pyramidal object (b) the partial derivatives $$\frac{\partial x}{\partial u} \quad \frac{\partial y}{\partial u} \quad \frac{\partial z}{\partial u} \quad \frac{\partial x}{\partial v} \quad \frac{\partial y}{\partial v} \quad \frac{\partial z}{\partial v} \quad \frac{\partial x}{\partial w} \quad \frac{\partial y}{\partial w} \quad \frac{\partial z}{\partial w}$$

which determine the tilt or orientation of the selected plane in object space.

These twelve words form the input to the affine transform blocks of the OAG shown in FIG. 11.

(c) uo, vo which locate the corner of the chosen window in the display.

(d) u, v, w which determines the incremental step in display space.

These five words are transferred to the I/O Controller 24 from the Host controller 76.

As shown in FIG. 11, there are three parallel paths 46, 47, 48 through the affine transform block in the OAG. For example, in the top path, the origin of the selected plane from the display icon, xo is combined in the digital accumulator 50 with the derivatives dx/du, dx/dv, dx/dw which determine the orientation vector or tilt of the selected plane. The output of the digital accumulator 50 passes to the multiplexer 52 (MUX) in FIG. 11 to determine the FRONT and LEFT edges of the selected plane. The output of the MUX 52 produces each coordinate in object space for the selected plane. Analogous operations occur in the parallel paths for coordinates and respective derivatives for y and z. The outputs from the three multiplexers (now x, y, z) in object space pass to the three inputs of the rectangular to polar coordinate transformer 54 which can use then well known commercially available chips TMC2330. The rectangular to polar transform also includes inputs for line spacing, near field blanking and angular scaling. Shift register D20 and D22 introduce necessary timing delays of 20 and 22 clock cycles respectively. The TMC2330 rectangular to polar transformer has a 22 clock cycle delay. Two of these parts in series generate the Output Radius value for a total of 44 clock cycles. A commercially available LMU18 16×16 multiplier 56 multiplies the output Radius by the Line Spacing Factor to calculate the Line Spacing output. Two LMU18s 56 multiply the θ and φ Outputs from their respective TMC 2330s by the Angle Spacing Factor from the Radius to get OAG Radius. This completes the generation of output addresses in object space which are used by the Scan Data Buffer to pass the echo data to the Video Output Buffer.

The Scan Converter 19 has two video outputs: a 60 fps, 640×480 RGB display and a 30 fps composite NTSC version of the same data. The NTSC signal is derived from the 60 fps display by the alternately displaying the odd and even fields of each display frame for the interlaced NTSC signal which is 60 interlaced field/sec and only 30 fps. The host sets a parameter to signal the Scan Converter that a new set of display parameters has been loaded. Before converting each new frame of scan data, the scan converter tests the parameter metaphor. If it is set, the Scan Converter clears the parameter metaphors and the host has until the end of this frame to write a new set of display parameters, which will take effect on the next frame.

The following memory spaces must be allocated:

1 Kbyte scan converter control.

These are the control register which select the scan format, control the location, extent and viewport, enable/disable M-mode, etc. They are read/write register for diagnostic purposes.

2 Mbytes scan data buffer.

There is actually twice this much memory in the scan converter 19. One buffer 26 A is read by the output address register generator 28 while the other buffer 26 B is written by the I/O Controller 24. The host controller 14 will only be able to access the input buffer through the input controller.

½ Mbyte Video output frame buffer memory 30 A, B.

This is the output buffer into which the scan converter 19 writes the images. The video buffer 30 is monochrome; each byte is an unsigned 8-bit magnitude. There is actually twice as much memory in the Video Frame buffer 30, ½ Mbyte which the scan converter 19 and ½ Mbyte which is displayed. These physical memories are swapped when the scan converter 19 completes one frame of display. The video frame buffers 30 A, B are implemented with 256k×8 (2 Mbit) video RAMs, the scan converter 19 writes into the random access port of the write buffer and the serial access port is read to the display. The host controller 76 will only be able to access the ½ Mbyte output buffer by reading or writing its random access port, the C-scan or B-scan ultrasound images are written into a double-buffered frame buffer. One buffer is being displayed while the other is being written, then they are swapped so that the new images are over written.

Alternate Implementation

Pixels in the $\epsilon,\eta$ display space do not have a one to one mapping with voxels in the R,$\phi$, $\theta$ space which causes two problems with a simple readout in raster format of the transformed display space as discussed above. The first problem is that near the apex of the pyramid, multiple R,$\theta$, $\phi$ points from the 4096 line scan have the same address in the u,v space.e., more than one volumetric image point is mapped it the output display point, the second problem is that, near the periphery of the scan, only one volumetric data point is available per per six display pixels.

To solve this mapping problem, the data in the volumetric image space may be resampled or interpolated in an alternate implementation before it is displayed. Thus, when the display space is being written in raster format, each point from the image space that is acquired could be replaced by a set of 4×4×4 of the nearest neighbors to the voxel. This set of 4×4×4 voxels is used to calculate the best value for the pixel in display space. For points not near the apex of the scan, a three dimensional separable cubic convolution kernel can interpolate the missing points. This method has been described in the literature as exemplified by Parker et al. This method preserves edges and peak amplitudes to perform the filtering and bicubic estimation. Approximately 147 adds and subtracts are done in a 25 mhz cycle, per pixel to implement the resampling. The interpolation filter is accomplished using for example) twenty one LF2246 Digital Finite Impulse Response Filter Chips. Sixteen filters are used in range detection, 4 in the elevation (θ) direction and one in the azimuthal (θ) direction to complete the interpolation.

Figure 12:
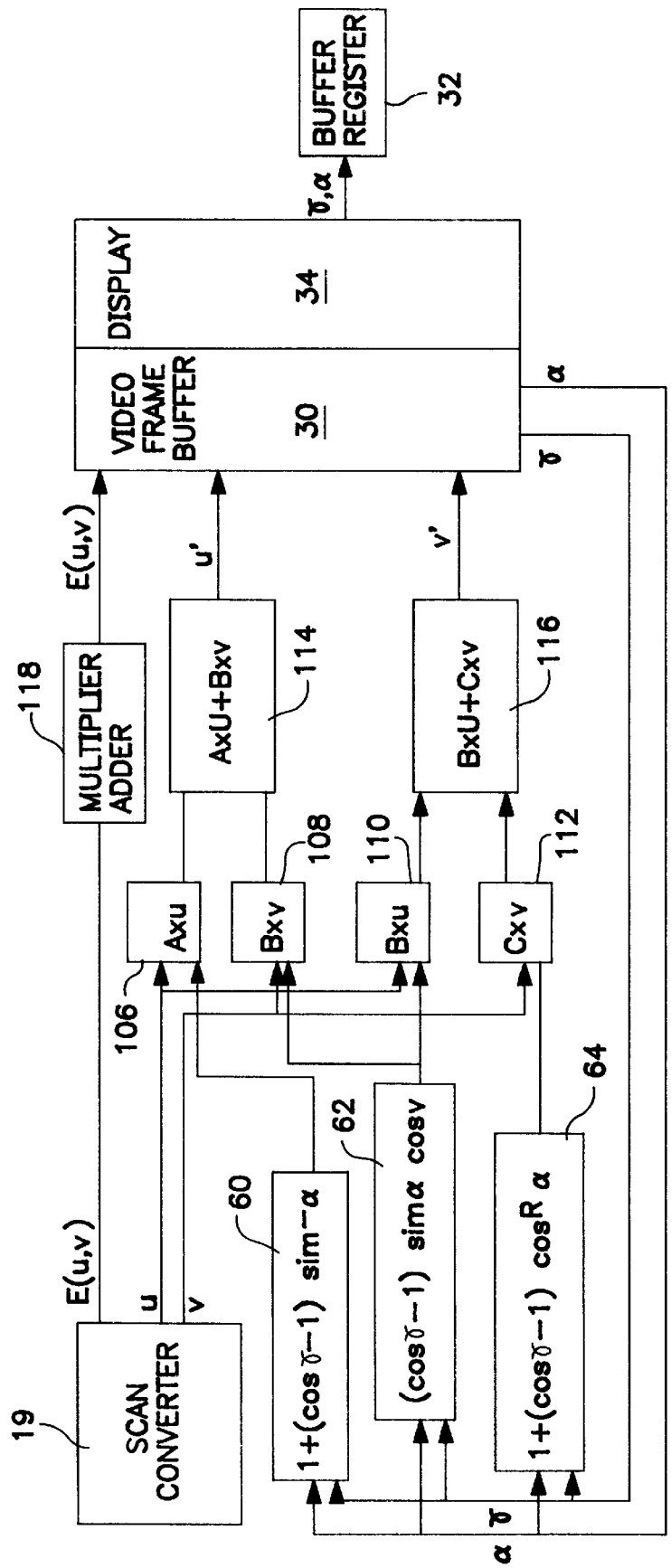
FIG. 12 shows a schematic for selecting the view direction

FIG. 12 shows a flow diagram for assigning new values, $\xi\eta$ to display coordinates u,v such as to shear the image in order to present an impression of three dimensions to the viewer as shown in FIG. 3B. The mathematics of the conversion was discussed above in connection with FIG. 3C. Scan converter 19 outputs a stream of each date E(u',v') and coordinates u',v'. Track ball interacting with display screen 34 and display buffer memory 30 generate angles $\alpha$ and $\delta$ according to the tilt and orientation of the view direction selected by the viewer. These parameters are used to compute A, B, C from adder/multiplier circuits 60, 62, 64 respectively where:

$A = 1 + (\cos\delta - 1)\sin^2\alpha$ $B = (\cos\delta - 1)\cos\alpha\sin\alpha$ $C = 1 + (\cos\delta + 1)\cos^2\alpha$ A, B, C are combined with coordinates u',v' in multiplier/adders 114 and 116 to produce modified coordinates $\xi,\eta$ respectively, where:

$\xi = A\ u' + B\ v'$ $\eta = B\ u' + C\ v'$

Echo data, E(u',v') and coordinates $\xi,\eta$ are input to the display buffer memory 30 for display on screen 34.

The above description presents embodiments of the invention which we presently believe are preferred for carrying out the invention. Other embodiments and variations may be considered after studying the drawings and specification which are within the scope of the invention. I therefore wish the scope of my invention to be defined by the appended claims.

I claim:

1. An apparatus for one of:
   (i) injecting drugs into a desired location of a region in a patient;
   (ii) aspirating a body fluid from a desired location of a region in a patient;
   which comprises:
   an injector means having an injector conduit with an entry end and an exit end for injecting said conduit into said patient;
   means for one of:
   (i) injecting drug through said conduit from said entry end to said exit end;
   (ii) aspirating fluid through said conduit from said exit end to said entry end;
   display means for displaying an image of said region on a video monitor;
   means for displaying on screen simultaneously with said image of said region a virtual image of said injector conduit;
   said virtual image displayed at a location relative to said image of said region corresponding to where said exit end of said conduit is located when said conduit is injected into said region providing that an operator is enabled to view said image of said region and adjust a position of said injector means relative to said desired location prior to injecting said conduit thereby ensuring that, when said conduit is injected into said region and one of:
   (i) said drug is injected through said conduit, said drug will enter said region at said desired location;
   (ii) said body fluid is aspirated through said conduit, said body fluid is aspirated from said region at said desired location.

2. The apparatus of claim 1 wherein said means for displaying comprises means for simultaneously displaying in real time and image of at least one cross section of variable thickness of said refion, said at least one cross section being any cross section of said object and selected by a viewer viewing said displayed image.

3. The apparatus of claim 2 wherein said region has a range of accoustical properties and said means for displaying an image of said region comprises:
   radiating means adapted for radiating said region with a first plurality of sonic beams such that each said beam generates a wave reflected from a second plurality of locations distributed in said region;
   resolving means for resolving said wave into echo data, each said datum of said echo data representing intensity of reflection of one of said first plurality of sonic beams from one of said second plurality of locations in said object respectively;
   means for selecting a set of echo data taken from a third plurality of locations in said second plurality of locations corresponding to said any cross section selected by said viewer;
   converting means for converting said set of echo data to brightness signals to said screen whereby said image of said selected cross section is displayed on said monitor screen.

4. An apparatus as in claim 3 wherein said means for radiating includes:
   array means having a radiating surface adapted for radiating said sonic pulsed beam from said radiating surface in any one direction of said first plurality of transmit directions, each transmit direction definable by azimuthal and elevational angular coordinates
   means for successively pulsing said array means to emit said first plurality of transmitted beams;
   means for controlling each said transmit directions to lie in a repeted pattern of transmit directions such as to intersect said object.

5. An apparatus as in claim 4 wherein said array means comprises:
   a hand held base having a face;
   an array of ultrasonic transducer means mounted on said face for forming an ultrasonic radiating surface;
   said transducers arranged to form at least one column of transducers perpendicular to at least one row of transducers; and
   said conduit being mounted together with said array on said hand held base positionable with said conduit lying along a fixed center line oblique to said array in one position where said conduit is retracted from a body of said patient when said array is flush against said body and another position where said conduit is extended into said body by a length when said array is flush against said body;
   means for selecting said length whereby an operator is enabled to view said image of said region and said virtual image and position said array with said exit opening of said virtual image positioned at said image of said desired location of said region prior to injecting said conduit into said body of said patient.

6. An apparatus as in claim 5 wherein said means for displaying said image of said selected cross section comprises:
   a memory means having addresses for storing said set of echo data corresponding to said selected cross section;
   means for addressing each said address to store echo data at a time selected to coincide with a beam orientation such that each address in memory corresponds to a position of one of said locations in said region relative to a position of said array whereby an operator is enabled to position said image of said selected cross section at any location on said screen by adjusting a position of said array; and
   said means for displaying said virtual image of said conduit comprises data stored in said memory that produces a bright line on said screen corresponding to conduit addresses of locations lying along a line of extension of said injector conduit from said array;
   said means for selecting length including means for displaying brightness on said screen includes means for selecting said conduit addresses in memory corresponding to said length whereby said virtual image of said conduit is enabled to be positioned relative to said image of said region by said operator adjusting a position of said array on said body of said patient and adjusting a length of said line until an end of said line coincides with a location in said image of said region corresponding to where it is desired to inject said drug in said region whereby said operator is enabled to insert said conduit into said region and inject said drug into said desired location.

7. The apparatus of claim 5 wherein said injector comprises:
 a hypodermic syringe supported on said base and with sad conduit including a hypodermic needle of said hypodermic syringe;
 said syringe having a barrel and plunger means for one of:
  (i) forcing drug in said barrel through said conduit and out of said exit end of said conduit;
  (ii) aspirating fluid from said region into said exit end through said conduit and out of said entry end into said barrel.

8. The apparatus of claim 7 which comprises:
 linear stepper actuator means coupled between said plunger and said barrel for controlling a position of said plunger in said barrel;
 means for applying a signal to said actuator whereby an amount of one of
  (i) drug injected into;
  (ii) fluid aspirated from;
 said region is selectable.

9. The apparatus of claim 7 which comprises:
 linear stepper actuator means coupled between said base and said syringe for controlling injection of said conduit into said body of said patient;
 means for applying a signal to said actuator whereby said length of said conduit injected into said patient is selectable.

10. The apparatus of claim 7 which comprises a first ultrasonic transducer means coupled to said barrel for transmitting ultrasound energy into said drug passing through said conduit.

11. The apparatus of claim 7 which comprises a second ultrasonic transducer means coupled to said syringe for transmitting uktrasonic energy to said conduit while said conduit is being injected into said patient.

12. The apparatus of claim 5 comprising means for directing an ultrasonic beam continuously on said region of said patient during a period being at least one of:
 (i) a period before injecting said conduit into said body;
 (ii) a period while injecting said conduit into said body;
 (iii) a period before injecting said drug through said conduit into said body;
 (iii) a period while injecting said drug into said region;
 (iv) a period after injecting said drug into said region.

13. A method for injecting a drug into a desired location of a region in a patient which includes the steps in operable order:
 (a) providing a device which comprises:
  (i) an injector means having an injector conduit with an exit end for injecting said conduit into said patient;
  (ii) display means for displaying an image of said region on a video monitor;
  (iii) means for diplaying on said screen simultaneously with said image of said region a virtual image of said injector conduit;
 (b) applying said device to display said image and said image of said region to provide that said virtual image is in a location relative to said image of said region correspondint to where said exit end of said conduit is located when said conduit is injected into said region proviing that an operator is enabeled to view said image of said region and said virtyual image and adjust a position of sid injector means relative to said desired location prior to injecting said conduit thereby ensuruing that, when said conduit is injected into said region, and said drug is injected through said conduit, said drug will enter said region at said desired location,
 (c) inserting said conduit into said body with said exit end positioned at said location;
 (d) injecting said drug into said location.

14. A method for one of:
 (i) injecting a drug into
 (ii) aspirating a fluid from
  a desired location of a region in a patient which includes the steps in operable order
 (a) providing a device which comprises:
  (i) an injector means having an injector conduit with an exit end for injecting said conduit into said patient;
  (ii) display means for displaying an image of said region on a video monitor;
  (iii) means for displaying on said screen simultaneously with said image of said region a virtual image of said injector conduit;
 (b) applying said device to display said virtual image and said image of said region such that said virtual image is in a location relative to said image of said region corresponding to where said said exit end of said conduit is located when said conduit is injected into said region providing that an operator is enabled to view said image of said region and said virtual image and adjust a position of said injector means relative to said desired location prior to injecting said conduit thereby ensuring that, when said said conduit is injected into said region and one of:
  (i) said drug is injected through said conduit, said drug will enter said region at said desired location;
  (ii) said fluid is aspirated through said conduit from said region at said desired location;
 (c) inserting said conduit into said body with said exit end positioned at said location;
 (d) one of:
  (i) injecting said drug into said location;
  (ii) aspirating fluid from said desired location.

15. The method of claim 13 which includes at least one of the steps:
 (i) directing an ultrasonic wave onto said location before injecting said conduit into said region;
 (ii) directing an ultrasonic wave onto said location while injecting said conduit into said region;
 (iii) directing an ultrasonic wave onto said location before one of aspirating said fluid and injecting said drug into said region;
 (iv) directing an ultrasonic wave onto said location before one of aspirating said fluid and injecting said drug through said conduit into said region.

* * * * *